United States Patent [19]

Iyengar et al.

[11] Patent Number: 5,026,627

[45] Date of Patent: Jun. 25, 1991

[54] HIGH STRENGTH ALKALI BLUE PIGMENT TONER USEFUL IN BOTH OIL-BASED AND WATER-BASED SYSTEMS

[75] Inventors: Doreswamy R. Iyengar, Ann Arbor; Thomas L. Praamsma, Holland, both of Mich.

[73] Assignee: BASF Corporation

[21] Appl. No.: 536,050

[22] Filed: Jun. 11, 1990

Related U.S. Application Data

[63] Continuation of Ser. No. 258,003, Oct. 14, 1988, abandoned.

[51] Int. Cl.⁵ ............................................. G03C 5/00
[52] U.S. Cl. ................................... 430/331; 430/291; 430/309; 106/23; 106/408; 106/476; 106/477
[58] Field of Search ..................... 430/291, 309, 331; 106/23, 408, 476, 477

[56] References Cited

U.S. PATENT DOCUMENTS 4,456,485  6/1984  Iyengar ............................. 106/408
4,576,649  3/1986  Oliver et al. ......................... 106/23

Primary Examiner—Hoa Van Le

[57] ABSTRACT

The alkali blue dry toner comprises 60 to 98 weight percent alkali blue pigment particles, 1 to 20 weight percent of di- and tri-decyl phosphate esters of free acids, and 1-20 weight percent of dehydroabietyl amine. The toner exhibits a high strength and soft texture in comparison with prior art pigment compositions made from similar ingredients.

6 Claims, No Drawings

HIGH STRENGTH ALKALI BLUE PIGMENT TONER USEFUL IN BOTH OIL-BASED AND WATER-BASED SYSTEMS

This is a continuation of copending application Ser. No. 07/258,003 filed on Oct. 14, 1988, now abandoned.

BACKGROUND OF THE INVENTION

1. Field of the Invention

The present invention is related to specific types of pigment compositions which are especially suited to both oil-based and water-based systems, as well as processes for flexographic printing using these pigment compositions. More particularly, the pigment composition of the present invention comprises an alkali blue pigment. The pigment composition of the present invention exhibits a high strength and soft texture in comparison with prior art pigment compositions made from similar ingredients.

2. The Related Art

The closest related art of which applicants are aware includes the following U.S. Pat. Nos.: 4,456,485; 4,383,865; 4,032,357.

U.S. Pat. No. 4,383,865, to Iyengar, discloses a process for preparing a soft textured, high strength Alkali Blue pigment composition which comprises insolubilized amines. This composition is made by mixing a solution of alkali blue crude first with an alkaline solution of an alkyl aryl sulfonic acid, then with an acidic solution having from 3 to 36 carbon atoms, following which the pigment composition is recovered. In the '865 patent the preferred group of alkyl aryl sulfonic acids has from 1 to 14 carbon atoms. The most preferred alkyl aryl sulfonic acid appears to be dodecylbenzene sulfonic acid.

U.S. Pat. No. 4,456,485, also to Iyengar, discloses a process for preparing easily dispersible high color strength powdered alkali blue pigments by precipitating the pigment in the presence of various acids and/or amines, and/or esters, and/or alcohols, etc., as well as the product of these processes.

U.S. Pat. No. 4,032,357, assigned to Sherwin-Williams Company, discloses a substantially anhydrous, free-flowing alkali blue pigment composition having an organic anionic dispersant coprecipitated therewith. Furthermore, the pigment and dispersant are admixed with an oil phase in order to reduce the hydrophilic aggregation of the coprecipitated pigment and dispersant. The specific organic dispersants used in the '357 patent are Gafac ® RS-710 and Gafac ® RS-610.

As can be seen in the appended claims, the scope of the present invention is limited to pigment compositions comprising alkali blue pigment in combination with:
(1) di- and tri- decyl phosphate esters of free acids; and
(2) dehydroabietyl amine.
In contrast, none of the related patents listed above recites this specific combination of elements. Furthermore, none of these related patents refers to flexographic printing.

BRIEF SUMMARY OF THE INVENTION

The present invention relates to both a product and a process. The product is a dry toner useful in both water-based and oil-based printing inks. The product comprises:
(a) between 60 percent, by weight, and 98 percent, by weight, alkali blue pigment particles;
(b) between 1 percent by weight and 20 percent by weight of a surfactant selected from the group consisting of di- and tri- decyl phosphate esters of free acids;
(c) between 1 percent by weight and 20 percent, by weight, of dehydroabietyl amine, said weights based on the total composition.

The process of the present invention is a flexographic printing process in which an ink is applied to a flexible plate in a flexographic printing machine. The ink used in this process comprises the toner which is the product of the present invention.

DETAILED DESCRIPTION OF THE PREFERRED EMBODIMENTS

It has been unexpectedly found that a particular combination of surfactants, when incorporated with an Alkali Blue pigment, produce a pigment product having the desirable characteristic of exhibiting high strength when used in either water flexo or oil ink end uses. The surfactants utilized are (1) di- and tri- decyl phosphate esters of free acids, together with (2) dehydroabietyl amine.

The di- and tri- decyl phosphate esters which have been found to be advantageous in the product and process of the present invention comprise:

TABLE I

| Manufacturer | Trade Name | Class and Formula |
|---|---|---|
| GAF Chemicals Corp. | Gafac ® BG-510 | free acid of a complex organic phosphate ester |
| GAF Chemicals Corp. | Gafac ® RA-600 | free acid of a complex organic phosphate ester |
| GAF Chemicals Corp. | Gafac ® RD-510 | free acid of a complex organic phosphate ester |
| GAF Chemicals Corp. | Gafac ® RS-410 | free acid of a complex organic phosphate ester |
| GAF Chemicals Corp. | Gafac ® RS-610 | free acid of a complex organic phosphate ester |
| GAF Chemicals Corp. | Gafac ® RS-710 | free acid of a complex organic phosphate ester |
| Sybron Chemicals, Inc. | Tanaterge PE-37 | sodium salt of complex organic phosphate ester |
| Cyclo Corporation | Cyclophos ® PL6A | free acid of organic phosphate ester |
| Cyclo Corporation | Cyclophos ® TD6 | free acid of a complex organic phosphate ester |
| Dexter Chemical Corp. | Strodex ® SEK-50 | potassium salt of complex organic phosphoric acid ester anhydride |

Additional di- and tri- decyl phosphate esters of free acids are useful in the product and process of the present invention.

The second surfactant used in dehydroabietyl amine. Although the product and process both utilize between 1 weight percent and 20 weight percent of both (1) dehydroabietyl amine and (2) the di- and tri-decyl phosphate ester/free acid surfactant, it is most preferred to utilize approximately 5 weight percent of the phosphate ester surfactant and approximately 5 weight percent of dehydroabietyl amine.

Example 1 (below) illustrates a most preferred process for making a most preferred product of the present invention. Example 2 illustrates a comparative product. Following the Examples are comparative results of pigment strength. These results indicate that the pigment composition of the invention is superior to the toner made in the comparative example. The superiority of the toner of the invention extends to both water flexo and oil ink end uses. The comparative composition was weaker in strength than the toner of the invention. This is very significant, as less of a toner is required where the toner has a higher strength. As can be seen in Table II, the toner of the present invention (i.e. Toner #1) was "stronger" than a comparative toner of the prior art (i.e. Toner #2). By the phrase "11 parts weaker" it is meant that 11 more parts of the weaker toner were required in order to achieve the strength of the standard.

EXAMPLE 1

This example illustrates how to make a preferred embodiment of the product of the present invention.

826 Grams of a 2 percent by weight aqueous sodium hydroxide solution containing 90 grams of Alkali Blue pigment was poured into a one liter beaker. [The alkali blue pigment had been produced by phenylation of parafuchsine with aniline, sulfonation with sulfuric acid, and was finally drowned in water.] 5.0 Grams of an alkyl phosphate ester (Gafac RS®-610) was then added to the beaker. The resulting mixture was then heated to and maintained at 60° C.

In a separate 3 liter beaker, 10.0 grams of a 50% solution of dehydroabietyl amine (e.g. Amine D Acetate) was dissolved in 1600 grams of a 2.4% by weight aqueous hydrochloric acid solution, at 60° C. The alkaline solution of pigment was slowly added to the HCl solution. The pH of the resulting mixture was adjusted to 0.85 and the slurry was heated to 95° C., and held at this temperature for 10 minutes. The resulting pigment dispersed very easily and was strong in tint in both oleoresinous and acrylic flexographic vehicles.

EXAMPLE 2 (COMPARATIVE)

795 Grams of a 2 percent by weight aqueous sodium hydroxide solution containing 88 grams of alkali blue pigment was poured into a 1-liter beaker. The alkali blue pigment was made as described in Example 1. 6.0 Grams of dodecyl benzene sulfonic acid was added to the beaker, and the resulting mixture was heated to, and maintained at, a temperature of 60° C.

In a separate 3-liter beaker, 6.0 grams of dimethyloctadecylamine were dissolved in 1300 grams of a 2 percent by weight aqueous hydrochloric acid solution at 60° C. The alkaline solution of pigment was slowly added to the HCl solution. The pH of the resulting mixture was adjusted to 0.85. The mixture was then heated to a boil. After 3 minutes, the slurry was flooded with cold water to a temperature of 60° C.

PIGMENT STRENGTH COMPARISON FOR EXAMPLES 1 and 2

The toners produced in Examples 1 and 2 (above) were compared for strength in an acrylic water flexo system and in a conventional oil ink. The following procedures were utilized in order to compare the toner of the invention with the toner made via Comparative Example 2. The results of these tests are shown in Table II.

WATER FLEXO TEST METHOD

The acrylic water flexo test method was carried out as follows: a 42.0 gram portion of the alkali blue toner was added to 238.0 grams of an acrylic vehicle system. The dry pigment was wetted into the vehicle system, and 800 grams of 0.125 inch diameter steel shot was added. The container was sealed and placed on a shaker for 25 minutes. The resulting ink was discharged and reduced with water to a specific print viscosity. The printone strength was measured by comparing the toner of the present invention to the comparative toner described in Example 2. A 2.00 gram portion of the finished ink was then added to 40.00 grams of a white tint base. This mixture was then placed on a shaker for 15 minutes. The tint strength was then comparatively measured from this sample.

OIL INK TEST METHOD

The oil ink test method was carried out as follows: A 0.500 gram portion of alkali blue dry toner was added to 1.000 gram of conventional vehicle system. This mixture was then ground on a Hoover muller for 3 passes; each pass consists of 50 revolutions. The resulting ink paste was then removed from the muller and a 0.100 gram portion was mixed into 5.000 grams of a conventional tinting white. The ultimate strength was obtained from this sample.

TABLE II

| Toner from Example | Printone Strength | Water Flexo Tint Strength | Oil Ink Ultimate Strength |
|---|---|---|---|
| 1 | (standard) | (standard) | (standard) |
| 2 | 9 parts weak | 11 parts weak | 14 parts weak |

The embodiments of the invention in which an exclusive privilege or property is claimed are defined as follows:

1. A dry toner useful in both water-based and oil-based printing inks, the toner comprising:
    (a) between 60 percent, by weight, and 98 percent, by weight, alkali blue pigment particles;
    (b) between 1 percent by weight and 20 percent by weight of a surfactant selected from the group consisting of di- and tri-decyl phosphate esters of free acids;
    (c) between 1 percent by weight and 20 percent by weight of dehydroabietyl amine, said weights based on total composition.

2. A dry toner as described in claim 1 wherein the dehydroabietyl amine is present in an amount of approximately 5 weight percent.

3. A dry toner as described in claim 1 wherein a surfactant selected from the group consisting of di- and tri- decyl phosphate esters is present in an amount of approximately 5 weight percent.

4. A dry toner useful in both water-based and oil-based printing inks consisting essentially of:
    (a) between 60 percent, by weight, and 98 percent, by weight, alkali blue pigment particles;
    (b) between 1 percent by weight and 20 percent by weight of a surfactant selected from the group consisting of di- and tri-decyl phosphate esters of free acids;
    (c) between 1 percent by weight and 20 percent by weight of dehydroabietyl amine, said weights based on total composition.

5. A dry toner as described in claim 4 wherein said dehydroabietyl amine is present in an amount of approximately 5 weight percent.

6. A dry toner as described in claim 4 wherein said surfactant selected from the group consisting of di- and tri-decyl phosphate esters is present in an amount of approximately 5 weight percent.

* * * * *